United States Patent [19]

Regev

[11] Patent Number: 5,469,166
[45] Date of Patent: Nov. 21, 1995

[54] METHOD TO GENERATE A CONTINUOUS PERIODIC SIGNAL FROM A SHORT SAMPLE OF THE SIGNAL

[76] Inventor: Zvi Y. Regev, 24217 Highlander Rd., West Hills, Calif. 91307

[21] Appl. No.: 276,911

[22] Filed: Jul. 19, 1994

[51] Int. Cl.⁶ ..................................................... G01S 7/38
[52] U.S. Cl. ................................................................ 342/14
[58] Field of Search .................................. 342/13, 14, 15

[56] References Cited

U.S. PATENT DOCUMENTS

| | | | |
|---|---|---|---|
| 3,760,417 | 9/1973 | Haeff et al. | 342/14 |
| 4,264,909 | 4/1981 | Hamilton et al. | 342/14 |
| 4,642,643 | 2/1987 | Wise et al. | 342/14 |
| 4,719,649 | 1/1988 | Woodsum et al. | 455/1 |
| 4,851,854 | 7/1989 | Drogin | 342/417 |
| 5,153,594 | 10/1992 | Moffat | 342/15 |

Primary Examiner—Charles T. Jordan
Assistant Examiner—Christopher K. Montgomery
Attorney, Agent, or Firm—William J. Schneider, Jr.

[57] ABSTRACT

This invention provides a means of providing a continuous signal which corresponds in phase and frequency to a brief instruction signal. The instruction signal is analyzed and the average frequency is determined. The average frequency is used as a basis for synthesis in a direct digital synthesizer or is substituted for the head to tail phase increment in a head to tail repeat synthesizer. The process can be carried out when only a fraction of a cycle is present in the instruction.

5 Claims, 2 Drawing Sheets

Received RF Pulse

Continuous Repeated Output from Memory

METHOD TO GENERATE A CONTINUOUS PERIODIC SIGNAL FROM A SHORT SAMPLE OF THE SIGNAL

FIELD OF THE INVENTION

This invention relates to the field of Electronic Warfare, EW. EW strategy often requires that a sustained response be generated to very short signal intercepts such as radar pulses, or even portions of radar pulses. The earliest workers in this field would tune a receiver manually to the intercept signal and then tune another oscillator manually to the receiver frequency. More recently this process has been automated in the fast set on oscillator and even later supplemented by phase lock technology. This technology has always required a compromise between the duration of the instruction pulse and the accuracy of the response frequency. The objective of this invention is to improve the ability of such a devices to achieve high accuracy while operating on short instruction time.

DESCRIPTION OF THE PRIOR ART

The furthest progress of the prior art known to me is embodied in head to tail synthesis employing the Digital RF Memory, DRFM. The DRFM measures the instruction pulse, quantizes the measurements and then samples the quantized signals at the sample clock frequency. The instruction pulse, depending on the method of the DRFM, is a complex signal which requires two descriptors, amplitude and phase if the DRFM employs polar coordinates, or inphase and quadrature amplitude if the DRFM employs Cartesian coordinates. A third DRFM implementation uses a sideband filter to restrict the instruction pulse to increasing or decreasing phase then measures only one descriptor.

In each DRFH type, the phase of the instruction signal relative to the phase of the sampling frequency, is implicit in the sampled data. If the polar system is used, phase data is available directly. If the Cartesian system is used phase must be computed using trigonometric functions. If the third DRFH type is used, the second descriptor can be computed taking the inverse sine or cosine and then taking the cosine or sine of the result. The descriptions of the invention and the prior art presented herein, the "Phase Sampler" is considered to include a suitable means of extracting phase data from the received instruction pulse.

This invention operates on the phase of the samples. The phase of the $1^{th}$ sample, $\Phi(i)$ is a binary fraction of a cycle. The instruction signal is a monotone pulse in which the average of the phase advances more or less uniformly between samples.

$$\Delta\Phi_{avg} = \pm \frac{f_i}{f_s} \quad \text{(1)Average Phase Advance}$$

where $f_1$ is the frequency of the instruction signal and $f_s$ is the sample frequency.

Such samplers are used in DRFMs. The phase of the instruction pulse is sampled then stored in memory and later recalled to form an approximate replica of the instruction signal.

The block diagram of the DRFM is shown in FIG. 4. The Instruction signal S(t), 41 is converted to phase samples by phase sampler 42, stored in temporary memory 43. Replicas are generated by recalling the phase data from the temporary memory 43, converted to sine/cosine values by the sine/cosine look up table 44 and to analog sine/cosine values in DAC(s) 45.

In the prior art, DRFMs were used in an attempt to generate a continuous signal from short sample of the instruction signal by generating replicas of the instruction pulse contiguously. The result was a continuous signal, but its frequency was not necessarily at the frequency of the instruction signal. The frequencies which resulted from this process was a convolution of the sin(x)/x spectrum of the instruction pulse with the line spectrum of the replication frequency. This latter was a line spectrum spaced at the replication frequency. Power could only occur at frequencies where both spectra were non zero, that at multiples of the sampling frequency. If the instruction signal frequency coincided with an integral multiple of the replication frequency the result was a continuous signal at the pulse frequency but this occurs only rarely. The more likely situation is that the instruction frequency is not an integer multiple of the sample frequency. The result in this case is a spectrum which contains all multiples of the sampling frequency each with an amplitude corresponding to the sin(x)/x spectrum of the instruction pulse; but not necessarily at the instruction frequency.

The location of the line spectrum can be shifted by adding a phase advance to successive replicas. The correct phase advance is that which results in an exact phase match between the tail of one replica and the head of the following replica. Prior art systems operate by measuring the end/beginning phase and adding a canceling phase to the replica.

It is a purpose of this invention to provide means for reducing the phase modulation at the replication frequency to an acceptable level. It is a further purpose of this invention to provide a means of eliminating the phase modulation at the replica frequency completely.

DESCRIPTION OF THIS INVENTION

The method described here enables the generation of a continuous periodic waveform (sine wave), based on a short sample of the signal. This method also applies to the repeated generation of sampled modulated signals such as radar pulses, with minimal phase discontinuity between repeated samples.

Figure 1:
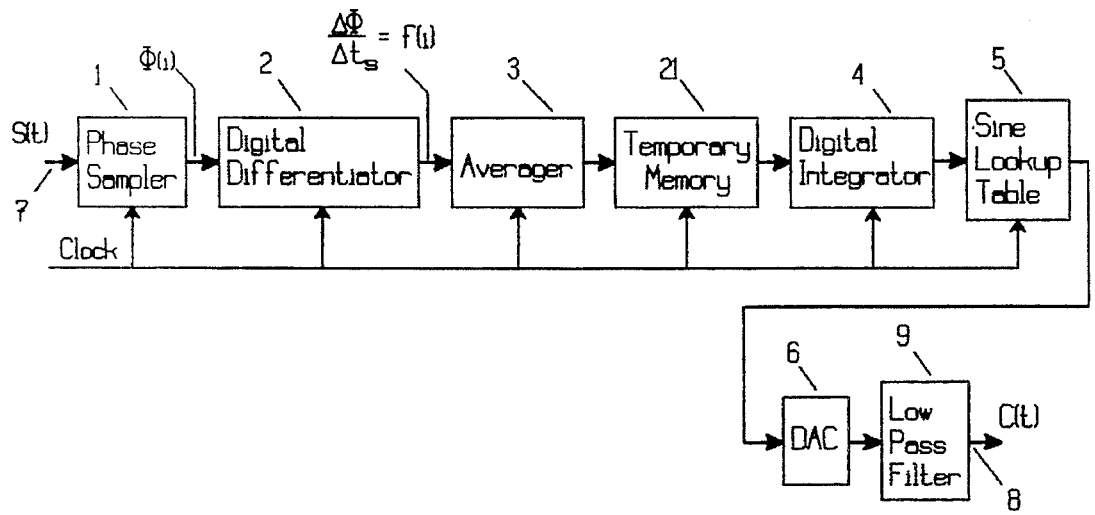
FIG. 1 Block Diagram of the Analysis/Synthesis Method of this Invention.

FIG. 1 is a block diagram of a system capable of generating a continuous sine wave based on a few contiguous samples of the Input Signal S(t) at 7. The Phase Sampler 1 is a special device or circuit which samples the incoming signal S(t) at a sampling clock frequency of $f_s$, and provides a digital code which represents the instantaneous phase $\Phi(i)$ of the sampled signal, per sample. Several methods were proposed to emulate phase sampling, which are discussed briefly above and are the subject of other patents.

$\Phi(i)$ is a digital presentation of the instantaneous phase of the sampled signal. The digital differentiator 2 differentiates $\Phi(t)$ to provide:

$$\text{Derivative of } \Phi(i) = \frac{\Delta\Phi(i)}{\Delta t_s} \quad \text{(2)Differentiator}$$

where $\Delta t_s = 1/f_s$ of the sampling period. This derivative is the instantaneous frequency of the sampled instruction signal.

Instantaneous frequency =

$$f(i) = \frac{\Delta\Phi(i)}{\Delta t_s} \quad \text{(3)Frequency of the sampled signal}$$

The averager 3, averages the digital representation of the instantaneous frequency f(i) by performing:

$$f_{avg} = \frac{\sum_{i=0}^{n} f(i)}{n} \quad \text{(4)Averager}$$

which represents the frequency of the periodic signal S(t). Actually the average frequency is the ration between input signal frequency and the sampling clock frequency.

$$f_{avg} = \frac{f_{s(i)}}{f_s} \quad \text{(5)Average Frequency}$$

Consequently $f_{avg}$ represents, in digital terms, the phase difference (average) per sampling period. This value is retained in the temporary memory 21.

The digital integrator 4 continuously sums up the input $f_{avg}$, one summation per clock period, to build up a linearly growing number. This growing number represents the discrete phase points of the continuous output waveform. This type of integrator is also known as Direct Digital Synthesizer or Numerically Controlled Oscillator (NCO). The output of such device, where applied to a Sine Look Up Table 5, followed by a DAC 6 and a low pass filter 9 is a continuous sinewave of a frequency fey close to that of the sampled signal. The output frequency precision depends on the number of samples of the input signal S(t).

In some applications it is desirable to receive samples and digitally store short RF pulses in order to be able to recall these stored signals from the memory and retransmit them as a replica or substitute to the original RF pulse. In these applications it is often required to recall the stored signals repeatedly such that the transmitted signal will have the appearance of a continuous waveform rather than individual pulses. A common problem in such applications is the phase difference between the leading edge of the pulse and its trailing edge. When such pulses are concatenated to form a pseudo CW, the phase mismatch between the segments (pulses) can be detrimental to the application.

Figure 2:
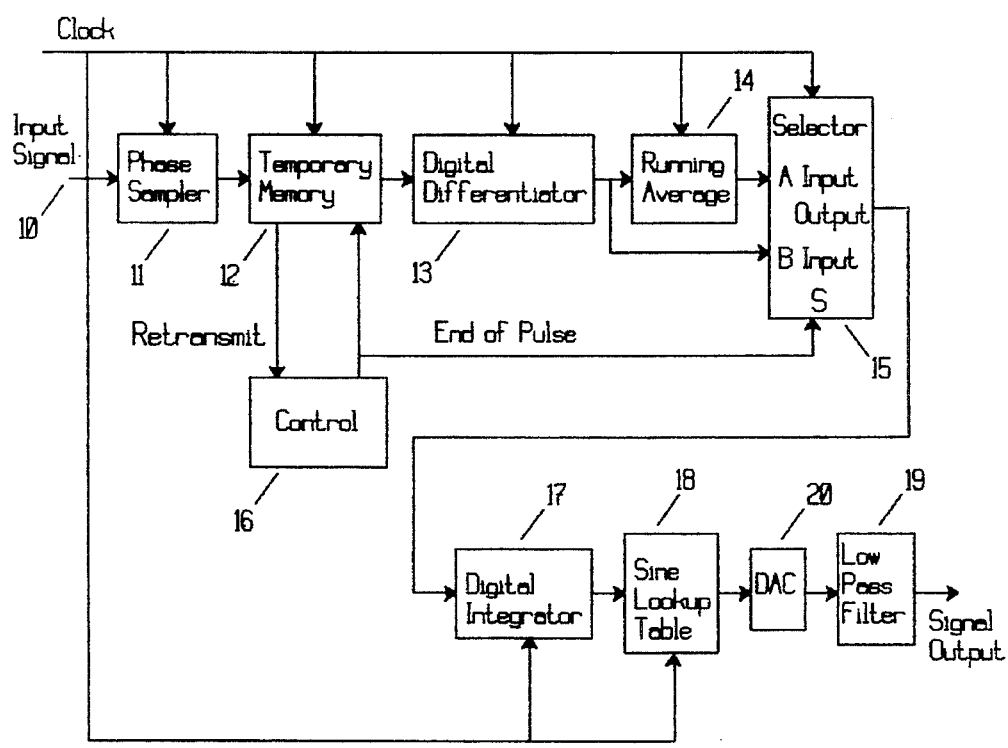
FIG. 2 Block Diagram of the Phase Correction Method of this Invention.

The method described here, applied as shown in FIG. 2, enables the generation of a pseudo continuous waveform out of sampled RF pulses with a minimum phase mismatch between the segments. The received RF pulse 10 is sampled using the Phase Sampler 11. The instantaneous phase samples are stored in a Temporary sequential Memory such as a FIFO (or a RAM with an address counter) 12.

When data is recalled from this memory it is differentiated (digitally) by the Digital Differentiator 13, the output of which is the instantaneous f required. This output is applied simultaneously to both a Running Averager 14, which averages the N last samples and to input A of Selector switch 15.

The other input, B, to the selector switch is the output to the averager.

Figure 3:
FIG. 3 Sequence of Events in Continuous Signal Generation by Head to Tail Synthesis.
Figure 3:
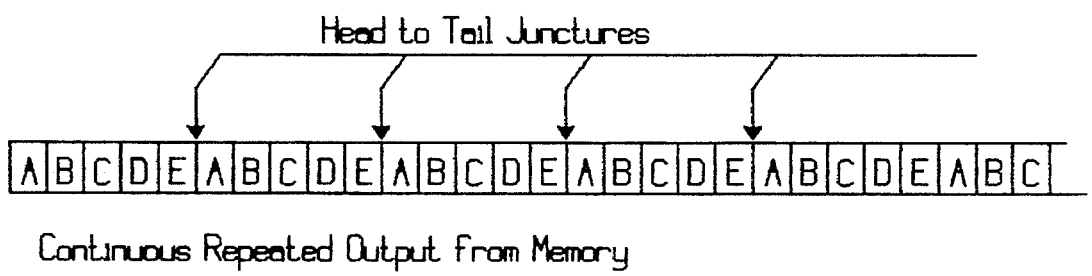
Figure 4:
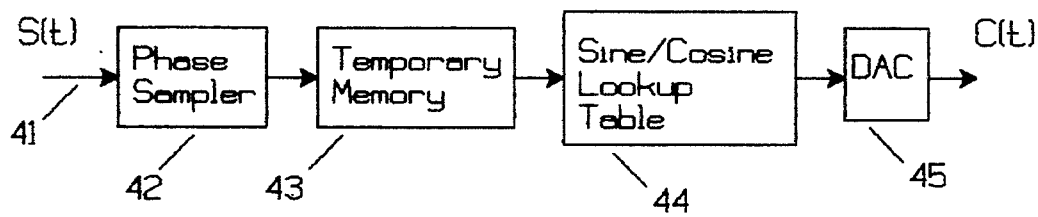
FIG. 4 Block Diagram of the Basic Digital RF Memory, DRFM.

The memory Control 16 is designed so that whenever the complete RF pulse (stored in memory) is read out, the same process repeats itself immediately and the RF pulse is read out of the memory from head to tail without any gap between the first read out and the subsequent read out, as shown in FIG. 3. The stored pulse is shown has samples A to E, the head to tail juncture between successive readouts is E to A.

When the memory is readout continuously as shown in FIG. 3, the output of the differentiator is actually the phase difference between samples of the RF pulse. However at the last sample of the pulse and the first sample of the repeated pulse, the differentiator produces the phase difference between the head and the tail of the pulse A to E which may, and usually is different from the phase differences between adjacent samples in the pulse; A to B, B to C etc; which is a phase error.

To avoid this situation, on the moment of the End of Pulse 21, and for one sample time only, the Switch 15 is changed to select the output of the Averager 14 instead of the Differentiator By doing so, the average phase difference between the last N samples is used instead of the heat to tail (wrong) phase difference, thus minimizing the phase errors.

As in the case of CW generation the phase differences are applied to a Digital Integrator 17 which integrates the instantaneous frequency back to instantaneous phase which in turn is applied to the Sine Look Up Table 18 and DAC 20 which converts the instantaneous phase into a piece wise approximation of a sinewave. The Low Pass Filter 19 removes all higher harmonics to produce a clean sinewave.

This invention provides a means of phase correction in which the head/tail phase is adjusted to the average value of the phase increment between samples.

I claim:

1. A system where a continuous signal is formed by a succession of two or more replicas of a stored signal, each represented as a sequence of measurements of the phase of the stored signal, a process for amelioration of phase discontinuities between replicas comprising:

a means of generating from the succession of replicas a derivative signal in which each value is a measure of the rate of change of phase of the succession of replicas followed by a means of generating from the derivative signal an average derivative signal, in which each value is a moving average of a number of preceding values of the derivative signal followed by a means of selecting the derivative of phase during the replication period and, at the point of transition between replicas for selecting the average derivative signal and followed by a means of accumulating the selected output values.

2. A system according to claim 1 wherein an approximation of the derivative is obtained by subtracting the value of each phase sample from the value of the preceding phase sample.

3. A system according to claim 1 wherein the derivative is approximated by subtracting the value of phase of the stored signal from the preceding value.

4. A system where a continuous signal is formed from a sequence of measurements of the phase of an instruction signal a means of synthesizing a frequency approximating the frequency of the instruction signal comprised of:

a means of generating a derivative signal in which each value is a measure of the rate of change of the instruction signal at that sample followed by a means of generating from the derivative signal an average derivative signal over one or more values of the derivative signal followed by a means of accumulating the sum of the average derivative signal.

5. A system according to claim 4 wherein an approximation of the derivative is obtained by subtracting the value of each measurement of the phase of the instruction signal from the preceding value.

* * * * *